(12) United States Patent
Turner

(10) Patent No.: US 7,574,186 B2
(45) Date of Patent: Aug. 11, 2009

(54) SELF-POWERED RADIO INTEGRATED CIRCUIT WITH EMBEDDED ANTENNA

(75) Inventor: James B. Turner, Monroe, WA (US)

(73) Assignee: Microsoft Corporation, Redmond, WA (US)

( * ) Notice: Subject to any disclaimer, the term of this patent is extended or adjusted under 35 U.S.C. 154(b) by 551 days.

(21) Appl. No.: 11/322,598

(22) Filed: Dec. 30, 2005

(65) Prior Publication Data

US 2007/0155328 A1    Jul. 5, 2007

(51) Int. Cl.
*H04B 1/06* (2006.01)
(52) U.S. Cl. .................... 455/264; 455/169.1; 455/195; 455/262; 455/343.1; 370/335; 370/328
(58) Field of Classification Search .............. 455/343.1, 455/550.1, 556.1, 562.1, 575.7, 522, 298, 455/264, 169.1, 195, 262, 572; 370/335, 370/328
See application file for complete search history.

(56) References Cited

U.S. PATENT DOCUMENTS

| | | | |
|---|---|---|---|
| 6,621,134 B1* | 9/2003 | Zurn | 257/415 |
| 6,775,258 B1* | 8/2004 | van Valkenburg et al. | 370/338 |
| 6,815,739 B2* | 11/2004 | Huff et al. | 257/275 |
| 6,830,221 B1* | 12/2004 | Janson et al. | 244/158.1 |
| 6,952,530 B2* | 10/2005 | Helvajian et al. | 398/128 |
| 7,012,327 B2* | 3/2006 | Huff et al. | 257/686 |
| 7,045,440 B2* | 5/2006 | Huff et al. | 438/456 |
| 7,231,874 B2* | 6/2007 | Rastegar et al. | 102/207 |
| 2003/0020173 A1* | 1/2003 | Huff et al. | 257/774 |
| 2003/0041767 A1* | 3/2003 | Rastegar et al. | 102/207 |
| 2004/0262645 A1* | 12/2004 | Huff et al. | 257/232 |
| 2005/0161753 A1* | 7/2005 | Huff et al. | 257/431 |
| 2007/0257634 A1* | 11/2007 | Leschin et al. | 320/107 |
| 2008/0108913 A1* | 5/2008 | Lengsfeld et al. | 600/595 |

OTHER PUBLICATIONS

Jeon, et al.; "Energy Harvesting MEMS Devices Based on $d_{33}$ Mode Piezoelectric $Pb(Zr,Ti)O_3$ Thin Film Cantilever"; Micro and Nano Systems Laboratory, Dept. of Mechanical Engineering, Massachusetts Institute of Technology; Nov. 2003; 5 Pgs.
Knivett, V.; "Power on a small scale"; MCC International, New Electronics; Mar. 2004; 4 Pgs.
O, et al.; "On-Chip Antennas in Silicon ICs and Their Applicatin"; IEE Transactions on Electron Devices, vol. 52, No. 7, Jul. 2005; pp. 1312-1323.
Sell, C.; "Good vibrations"; MCC International, New Electronics; Apr. 2005; 2 Pgs.

* cited by examiner

*Primary Examiner*—Matthew D Anderson
*Assistant Examiner*—Minh D Dao
(74) *Attorney, Agent, or Firm*—Merchant & Gould, P.C.

(57) ABSTRACT

A radio frequency circuit is generated as an integrated circuit that is arranged to provide transmission, receipt, and storage of data. The data is transmitted and received across a radio frequency band. An antenna is included within the integrated circuit, wherein the antenna is manufactured at the time the integrated circuit is manufactured. A power source is mounted adjacent to the integrated circuit. The integrated circuit and the power source are encapsulated within the same integrated circuit package.

20 Claims, 4 Drawing Sheets

US 7,574,186 B2

SELF-POWERED RADIO INTEGRATED CIRCUIT WITH EMBEDDED ANTENNA

BACKGROUND

Many user applications may be enhanced by automation. For instance security tag systems can use authentication via radio links to allow entrance to buildings and access computer information. Car engines may have wireless networks to reduce wiring complexity. Exercise equipment may be made more personal and track the user's profile. There are many other systems that people use each day that could be more user friendly and supply information to the user at various points during the normal day. However, widespread use of these systems requires the cost and size of the hardware to be reduced from today's systems. The RFID systems of today are low cost if they are not battery driven, but the physical separation is limited to 2 meters for RFID systems with nodes that have no battery. With such physical limitations, the usefulness of such devices results in being limited to certain applications.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Various aspects of the subject matter disclosed herein are related to a self-powered, radio integrated circuit (IC) that includes an embedded antenna. Such a circuit has a much broader range of application than previous supplied radio ICs since the range of communication is larger for a self-powered device rather than for those that do not have any internal power generation. This type of radio IC may be used to further enhance the design of existing products by the ability to remotely alter behaviors of systems and products that include these radio ICs. Furthermore, when supplied in a mesh network, the self-powered IC described herein allows for forwarding of data from IC to IC rather than just from IC to a powered data receiver. Additionally, the overall sizing of the IC is reduced over other designs that may include connection to a battery and antenna, but do not supply these components on a single IC These and other features and advantages, which characterize the present invention, will be apparent from a reading of the following detailed description and a review of the associated drawings. It is to be understood that both the foregoing general description and the following detailed description are exemplary and explanatory only and are not restrictive of the invention as claimed.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Embodiments are herein described more fully below with reference to the accompanying drawings, which form a part hereof, and which show specific examples for practicing the embodiments. However, embodiments may be implemented in many different forms and should not be construed as limited to the embodiments set forth herein; rather, these embodiments are provided so that this disclosure will be thorough and complete, and will fully convey the scope of the subject matter to those skilled in the art. Embodiments disclosed may be practiced as methods, systems or devices. Accordingly, embodiments disclosed may take the form of an entirely hardware implementation, an entirely software implementation or an implementation combining software and hardware aspects. The following detailed description is, therefore, not to be taken in a limiting sense.

When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments of the described herein are referred to variously as operations, structural devices, acts or modules. These operations, structural devices, acts and modules may be implemented in software, in firmware, in special purpose digital logic, and any combination thereof.

Figure 1:
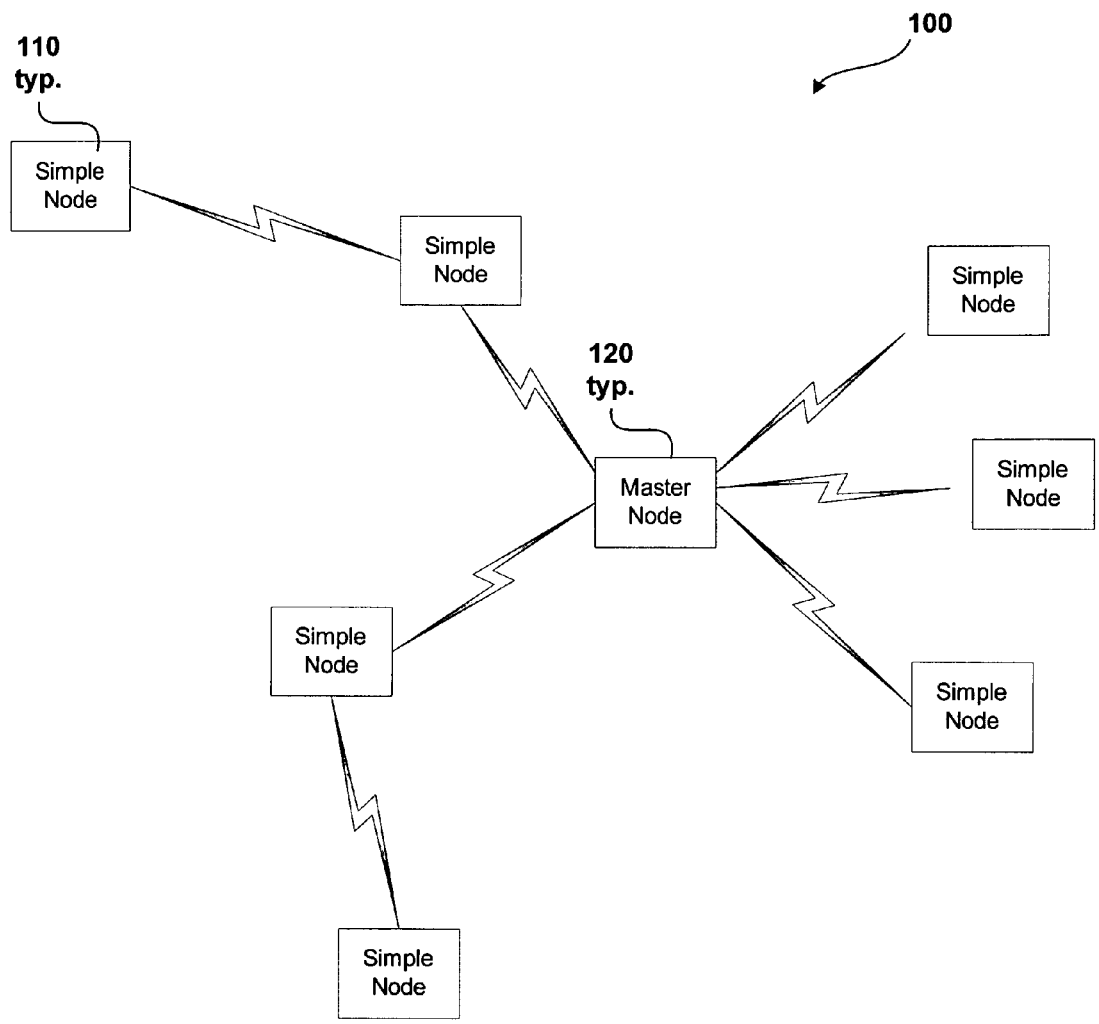
FIG. 1 illustrates an exemplary network within which a self-powered, radio IC may be used.

Referring now to the drawings, in which like numerals represent like elements, various aspects of the present invention will be described. FIG. 1 illustrates an exemplary network within which a self-powered, radio IC may be used. The network (100) corresponds to a radio network that includes both simple nodes (e.g., 110) and master nodes (e.g., 120). A radio network can consists of several simple nodes and one or more master nodes communicating with a primitive network protocol. In one embodiment, the data transmission from nodes is expected to be very short in duration compared to the cycle of transmitting. This low duty cycle provides for low average power consumption and allows simple contention mitigation. The simple nodes (e.g., 110) are self-powered and may be very low cost. An example integrated circuit corresponding to the simple node (e.g., 110) is described below in the discussion of FIG. 3. The master node (e.g., 120) is generally battery powered or has dedicated power and is often somewhat more expensive. The master node (e.g., 120) provides control of the more dedicated timing issues of data transmission within the network (100). The combination of master and simple nodes allows the network to operation on a mesh basis, using store and forward techniques to transmit data through the network. For example, a simple node (e.g., 110) may communicate to a master node (e.g., 120) through another simple node (see FIG. 1).

In one embodiment, the communication across the network (100) takes advantage of certain bands of RF communication. For example, network (100) may be configured for communicating data at the 5.8 GHz band (with a range of 100 MHz) or alternatively, at the 24 GHz band (with a range of approximately 250 MHz), since these are unlicensed bands that are not relatively crowded in the industry. Using the FM modulation for communication provides a couple of advantages that include signal-to-noise ratio level reduction and the ability to use passive filters when processing the data signals.

Figure 2:
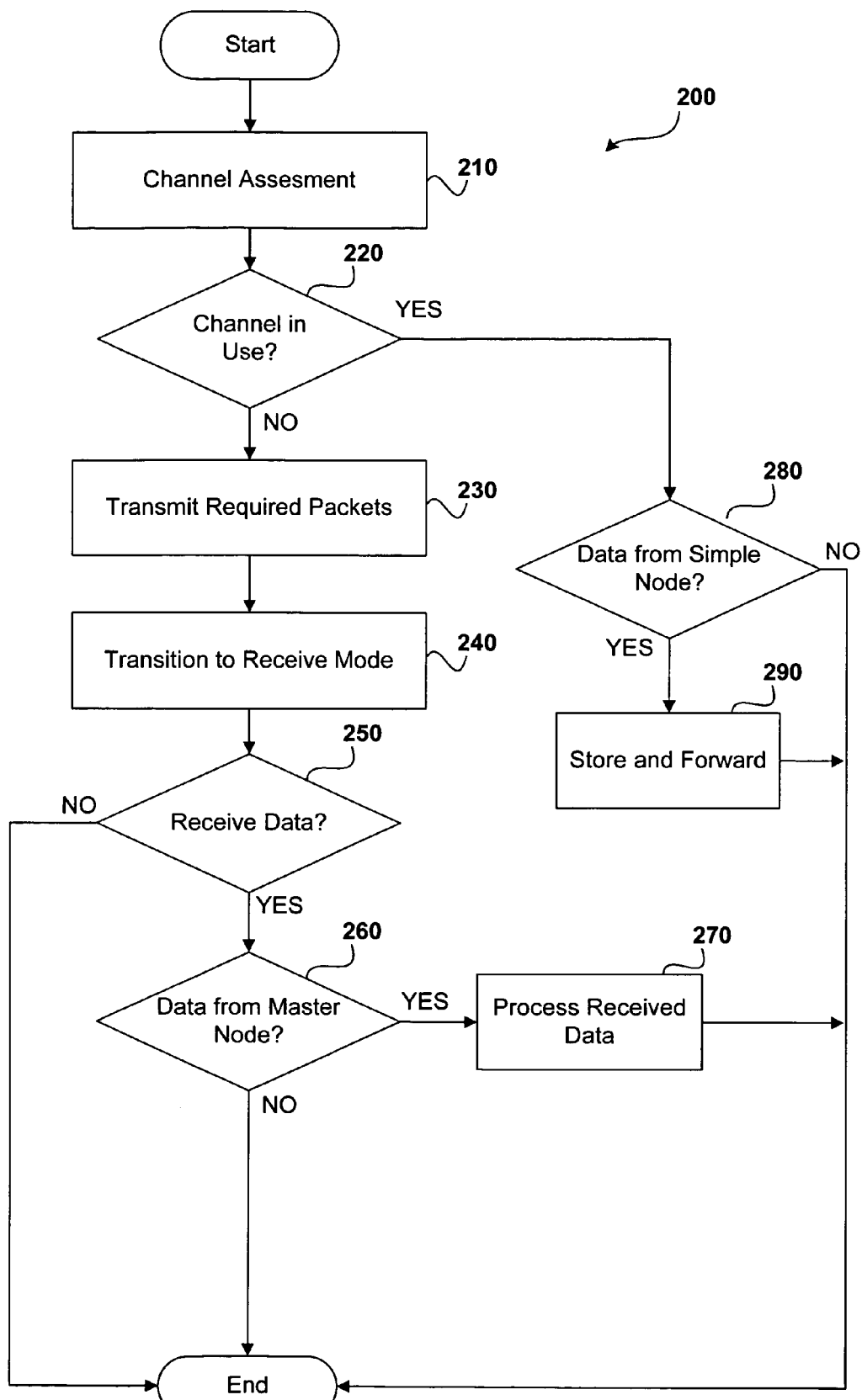
FIG. 2 is an operational flow diagram of an exemplary process for communication with a simple node.

FIG. 2 is an operational flow diagram of an exemplary process for communication with a simple node in accordance with the present disclosure. Process 200 starts when a radio network (e.g., 100) is constructed that includes simple nodes and master nodes. Processing continues with operation 210.

At operation 210, the simple node enters a channel assessment period. During the channel assessment period, the simple nodes of the radio network wake up per a rough timing schedule and receive in non-synchronous mode for the duration of a few packets. While in the channel assessment period, processing continues with decision operation 220.

At decision operation 220, a determination is made by the simple node whether the transmission channel of the simple node is currently being used. In one embodiment, if the channel is determined to be busy during the channel assessment period, an attempt is made to decode data from the channel and store the packets received. The busy channel may indicate that data is incoming from another simple node. If the channel is busy, processing moves to decision operation 280.

At decision operation 280, a determination is made whether the data received corresponds to data transmitted from another simple node within the network. If the data does not correspond to data received from another simple node, process 200 ends and processing continues by repeating process 200 or moving on to other tasks. However, if the channel in use does correspond to data being received from another simple node, processing continues at operation 290.

At operation 290, when the data received is marked as data from a different simple node rather than a master node, then the simple node retransmits the data along with the node ID during the next slot that is available and the node has no data of it's own to transmit. Therefore, when the data is received by the master node, the master node identifies the data according to its node ID even though the data was received from another simple node. Process 200 then ends and processing continues by repeating process 200 or moving on to other tasks.

The store and forwarding described above occurs when the channel is in use and data is received from another simple node. However, if no channel use is indicated during decision operation 220, then processing continues to operation 230.

At operation 230, the simple node transmits the required packets to either an upstream simple node or a master node. In one embodiment, the number of packets transmitted is a fixed number to simplify the network. Once the transmission of the data packet is complete, processing continues at operation 240.

At operation 240, the simple node transitions into receive mode. A delay of a few symbols allows the simple node to transition into receive mode. During receive mode the simple node is expecting acknowledgement of data reception from the master node and any configuration data needed from the master node. The delay is short enough that other simple nodes should not be transmitting because they have found the channel to be busy and are waiting a prescribed amount of time before re-assessing the channel. After the simple node has transitioned into received mode, processing moves to decision operation 250.

At decision operation 250, a determination is made whether data is received by the simple node. Data may not be received if the channel is determined to busy. If no data is determined as being received, then process 200 ends and processing continues by repeating process 200 or moving on to other tasks. However, if data is received, processing continues with decision operation 260.

At decision operation 260, a determination is made whether the data received corresponds to data from master node. If the data is from the master node, processing moves to operation 270.

At operation 270, the data received from the master node is processed. The data may include a simple acknowledgment that the master node received the data from the simple node corresponding to the simple node's most recent transmission. The data may also include configuration data that updates the simple node or the communication protocols used by the simple node. Once the received data is processed, process 200 ends and processing continues by repeating process 200 or moving on to other tasks.

If the data does not correspond to data from a master node, the data may be spurious data or noise in the transmission channel, and process 200 ends and processing continues by repeating process 200 or moving on to other tasks.

Process 200 may be performed with the operation described in any order, or with additional or fewer operations included. In one embodiment, the simple node used in process 200 corresponds to the simple node described below in the discussion of FIG. 3.

Figure 3:
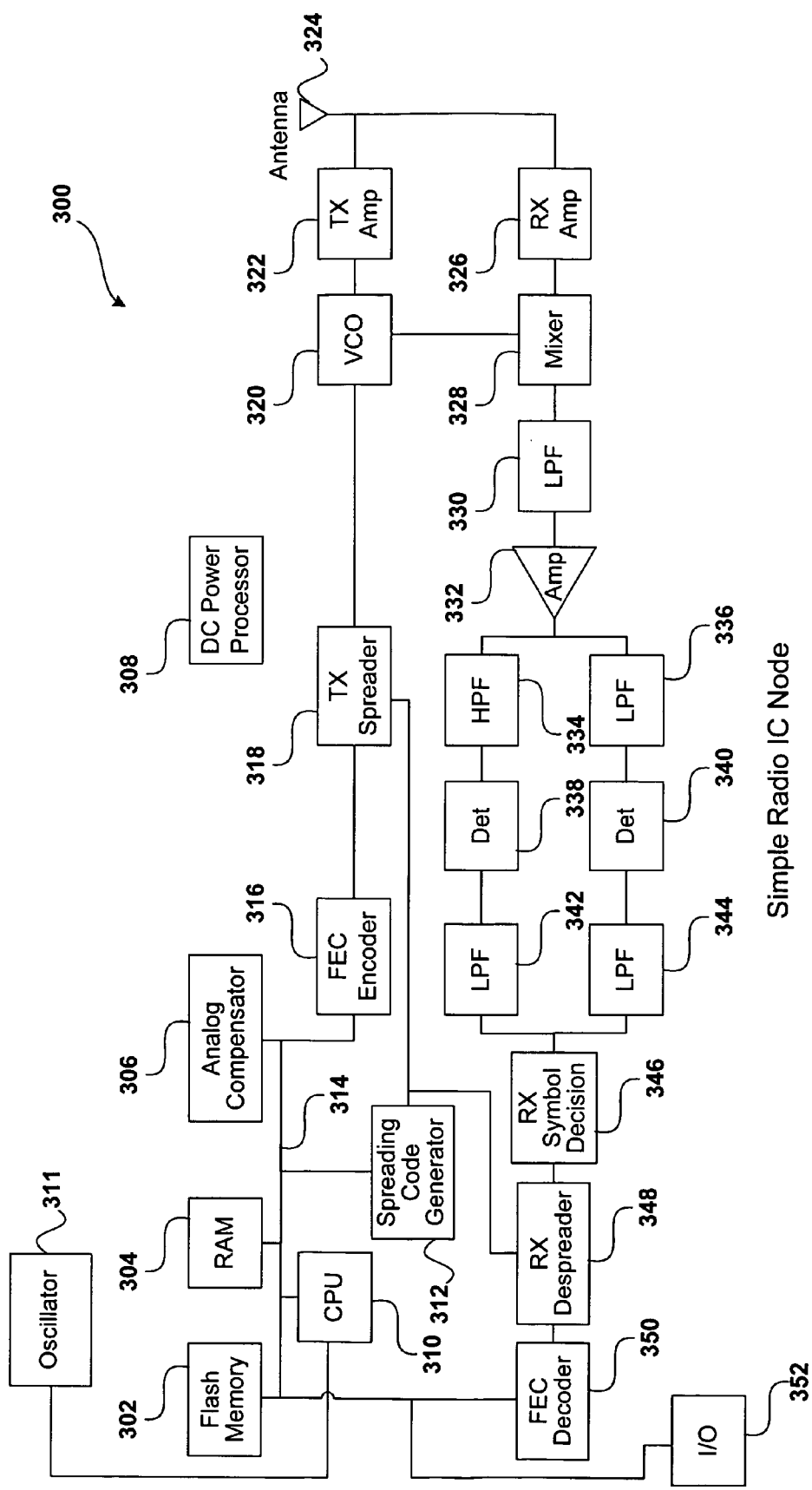
FIG. 3 illustrates a functional block diagram of an exemplary self-powered, radio IC with an embedded antenna.

FIG. 3 illustrates a functional block diagram of an exemplary self-powered, radio IC with an embedded antenna, in accordance with the present disclosure. The simple radio IC node (300) includes a flash memory (302), a random access memory (RAM) (304), an analog compensator (306), a DC power processor (308), a central processing unit (CPU) (310), an oscillator (311), a spreading code generator (312), a system bus (314), an forward error correction (FEC) encoder (316), a transmission (TX) spreader (318), a voltage controlled oscillator (VCO) (320), a transmission (TX) amplifier (322), an antenna (324), a receive (RX) amplifier (326), a mixer (328), four low pass filters (330, 336, 342, 344), an amplifier (332), a high pass filter (334), two level detectors (338, 340), a receive (RX) symbol decision module (346), a receive (RX) despreader (348), an forward error correction (FEC) decoder (350), and an input/output (I/O) module (352).

For readability of the figure, connections between both the analog compensator (306) and the DC power processor (308) to other functional blocks of the simple radio IC node (300) are not currently shown. For example, other than the connections shown, the analog compensator (306) is also coupled to functional blocks 318, 320, 322, 326, 328, 330, 334, 336, 342, 344, 346, and 348. Additionally, DC power processor (308) is coupled to each of the functional block where a supply of power is required for operation.

The simple radio IC node (300) is provided as a single IC or is provided within a single IC package. IC packages are often encapsulated within plastic or ceramic with the size of the packages being measured in millimeters. In one embodiment, the IC includes an antenna that is built during the IC generation processes. An example size that may correspond to the final IC product is within the range of a 10 mm×10 mm×1 mm IC. Such an IC may be coupled with sensors or other data gathering circuits, or have sensors embedded within the IC, that can take advantage of the simple radio IC node (300) to transmit its data to a central location or through a network.

In operation, the simple radio IC node (300) includes a processor or CPU (310) that controls the processes of the radio IC and is coupled to the other components through the bus line (314). The clock or timing for the processor is received from an internal LC oscillator (311). Alternatively, the timing of the CPU (310) may be provided by a ring oscillator, an LC tank oscillator, or other timing signal sources. The RAM (304) provides a memory location for assisting in the signal processing of the incoming and outgoing data streams. The flash memory (302) provides a temporary storage location for data received from another simple node. With the data stored in the flash memory (302), the data may be forward on to another node in the network (e.g., master node 120 of FIG. 1). The flash memory (302) also provides a data storage location for any analog compensation that takes place when the IC is generated as described below. Also, the flash memory also provides a storage location for the bits resulting from FEC encoding or decoding, also described below.

During transmission the voltage controlled oscillator changes frequency directly from the symbols being transmitted. Bits to be transmitted are encoded with Forward Error Correction encoding by the FEC encoder (316). The encoded bits are spread by a maximal length pseudo-random code to fulfill government requirements for unlicensed operation, and still provide a narrow bandwidth to give good received bit signal strength-to-noise ratio. In one embodiment, this spreading also helps overcome some signal fading issues. The data used by the FEC encoder (316) is obtained from the flash memory (302) or possibly from another circuit through the I/O module (352).

The output of the FEC encoder (316) is passed to the TX spreader (318) that provides for spreading of the signal (e.g., by direct sequence spread spectrum). The spreading code is provided by the spreading code generator (312). In one embodiment, the spreading code corresponds to a set of flip-flops that are adjusted to provide the desired code for spreading the signal. The spreading code provides a modulation technique where the transmitted signal takes up more bandwidth than the information signal that is being modulated. Spreading the signal provides greater accuracy of the data when the data is transmitted.

Once the signal is spread, the stream of bits produced are passed through the VCO (320) which is driven from the bits being received to set the transmission frequency. The frequency adjusted bits are then provided to the TX amplifier (322) for boosting the power of the transmission signal. For example, the TX amplifier (322) may boost the signal power by 0-10 dBm. This type of power consumption for transmission may be possible because in many applications, the duty cycle for the radio IC is extremely low. With the low duty cycle, almost the entire stored power may be utilized for the single signal transmission.

From the TX amplifier (322), the signal is passed to the on-chip embedded antenna 324. The embedded antenna may be one of many types. Three types of antenna that may be used correspond to the patch, slotted patch, or spiral antenna type. For the 2 different frequency bands previously mentioned (e.g., 5.725 to 5.85 GHz and 24.0 to 24.25 GHz) the antenna type is selected for the IC process used and the best form factor of the die. The antenna is formed from the top layer of metal for the die. Having the antenna made of the top layer of metal in the IC process allows better system efficiency in transmit mode and better noise reduction in receive mode because bond wires and board parasitics are not involved as normally encountered with radio ICs that have an external antenna.

The simple radio IC node (300) operates in full duplex mode, allowing signals to be received at the same time that signals are transmitted. When a signal is received at antenna 324, the signal is transmitted to the receiving side of the circuit (300) and is received by the RX amplifier (326). The RX amplifier (326) boosts the incoming signal to provide greater separation between the signal data and noise on the incoming channel.

The signal from the RX amplifier (326) is passed to the mixer (328) which mixes the signal down to a lower frequency (e.g., an infrared frequency) for processing. Stated differently, the entire bandwidth range in which the signal is included is moved down to a level that is more manageable by the passive filters. The received signal is then passed to a first low pass filter (330) that removes noise, the LO feedthrough, and the power in bands that are irrelevant to the signal.

The signal from the first low pass filter (330) is then provided to another amplifier (332) that bumps up the signal to provide higher voltage swings for processing and level detection.

In this embodiment, the signal is provided through two paths, where a high pass filter (334) lets through high level symbols and a second low pass filter (336) that lets through low level symbols included in the received signal. In one embodiment, the high pass filter (334) and the second low pass filter (336) have corner frequencies set to the midpoint of the incoming signal. The split signals are then provided to the level or amplitude detectors (338, 340) that detect the amplitude of the incoming symbols. Two more low pass filters (342, 344) are then used to set the noise limit for the incoming signals (e.g., signals with specified amplitude levels are allowed to pass through as data).

The RX symbol decision module (346) takes the information passed from the two low pass filters (342, 344) and determines whether a symbol corresponds to a high level or a low level. The two outputs provide for greater accuracy, since a symbol has a certain confidence level when both low pass filters (342, 344) agree on the whether the symbol is high or low. If there is no clear indication of whether the signal should be high or low, the RX symbol decision module (346) assigns the symbol an alternating value to keep the data stream whole and avoid DC offset, or a decision may be made to wait for a new incoming signal since a noisy condition is indicated. The RX symbol decision module (346) also moves the signal from the analog realm to digital realm.

The output of the RX symbol decision module (346) is provided to the RX despreader (348) that correlates the high and low bits of the spread received signal to highs and lows of the processed signal. Stated differently, the RX despreader (348) applies the reverse of the spreading code to the received signal that was applied at the TX spreader (318) to the transmitted signal for correlation. Similarly, the output of the RX despreader (348) is provided to the FEC decoder (350) for correlation with the FEC encoder (316) on the transmission side. The resulting data bits may then be stored in the flash memory (302) as needed.

Analog adjustments are determined during wafer test and during operation. At wafer test the VCO (320) and filters (330, 334, 336, 342, 344) are adjusted while being measured and the results stored in the IC flash memory (302). These adjustment tables are used to reduce variability from the IC process. Also temperature effects are included in the stored adjustment tables. During operation analog pulse detection levels are adjusted by monitoring the outputs of the filters (330, 334, 336, 342, 344) and detectors (338, 340) when no signals are present. Unique identification is stored in the flash memory (302) for each die during wafer test.

In an additional embodiment, the simple radio IC node (300) takes advantage of the I/O module (352) to receive an input or provide output to another circuit coupled to the IC.

In one embodiment, the power generation (e.g., from DC power processor 308) for the simple radio IC node (300)

comes from a Microelectromechanical Systems (MEMS) die that is mounted adjacent to the radio IC on the same chip carrier. Piezo electric affect turns mechanical energy into electrical energy. This electrical energy is converted from the raw Piezo output to a more usable voltage with some regulation by the radio IC. Having bond wires directly from the power source die to the radio die helps efficiency and allows system integration at the chip carrier level. Another approach is to mount rare earth magnets on the chip carrier and have the MEMS be vibrating arms with a metal coil. Then the electromotive force of the changing magnetic fields enclosed by the moving coil produces electric power. Both of these power generation methods require motion. So this system is usable in vibrating or accelerating environments including motors, machinery, a person walking, a person handling a key FOB, or the like.

Figure 4:
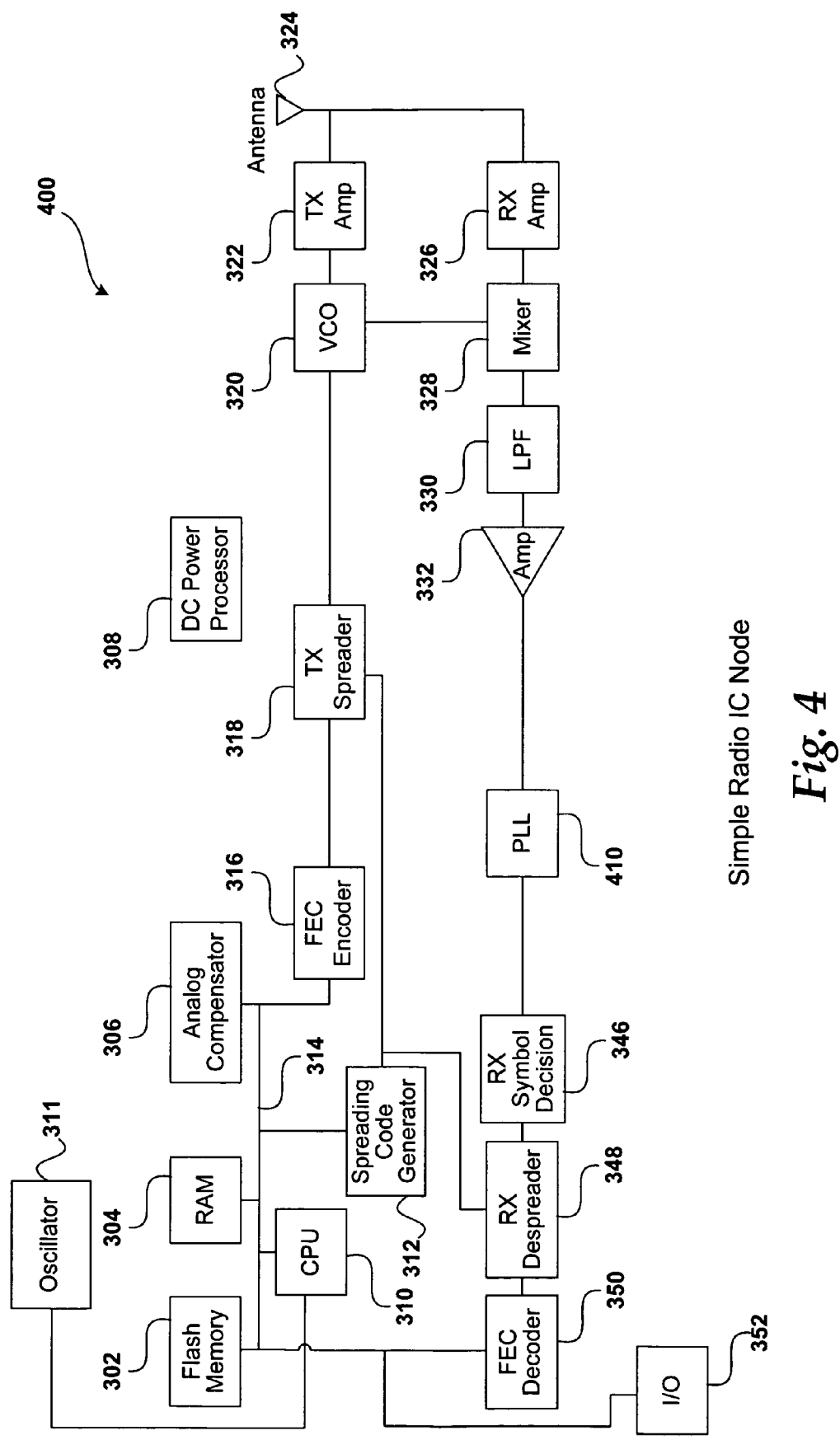
FIG. 4 illustrates a functional block diagram of another exemplary self-powered, radio IC with an embedded antenna, in accordance with the present disclosure.

FIG. 4 illustrates a functional block diagram of an exemplary self-powered, radio IC with an embedded antenna, in accordance with the present disclosure. The simple radio IC node (400) is substantially similar to the simple radio IC node (300) shown in FIG. 3. However, instead of the passive filter detection provided, the simple radio IC node (400) instead uses a phase-locked loop (PLL) (410) to determine the logic levels of the incoming symbols. A PLL (e.g., 410) may be used to track the levels associated with the incoming signals with a greater accuracy with a sacrifice of increased power consumption.

Other embodiments may also be used for both simple radio IC nodes (300, 400) shown in FIGS. 3 and 4 that include additional or fewer function blocks than those depicted.

The type of common IC carrier used can be determined by the frequency band used and the duty cycle intended. Plastic and ceramic IC packages come in a large variety for ICs in use today. These packages are manufactured in the 100 millions per month, so the cost is low. The packaged system (energy source and radio IC) can be mounted on a circuit board to interface with external components but may also be used as a complete system node just as a single IC packed part with no external components. When used in a stand alone mode the simple node may be an ID/security component, a hopping mesh node, or used to sense simple physical parameters such as temperature. The integrated circuit packaging that the simple radio IC node (300, 400) and the power source may be included within, correspond to standard IC packages such as a ball grid array surface mount package when the IC is used in a printed circuit board application, or another type of package when the IC is a stand alone.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. An apparatus, comprising:
an integrated circuit that is arranged to provide transmission, receipt, and storage of data, wherein the data is transmitted and received across a radio frequency band;
a transmitting side of the integrated circuit that is arranged to process the data for transmission; wherein the transmitting side comprises:
a voltage controlled oscillator that changes frequency directly from symbols being transmitted; an FEC encoder arranged to encode bits to be transmitted with Forward Error Correction encoding; a spreader configured to spread the encoded bits by a maximal length pseudo-random code while still providing a narrow bandwidth and after the signal is spread boosting power of a transmission signal using an amplifier;
a receiving side of the integrated circuit that is arranged to process the data when received; wherein the receiving side comprises:
an RX amplifier arranged to receive an incoming signal and pass the signal to a mixer which is arranged to mix the signal down to a lower frequency that is then passed to a first low pass filter that removes noise from the signal; from the first low pass filter the signal is then provided through two paths where a high pass filter lets through high level symbols and a second low pass filter lets through low level symbols included in the received signal; wherein the first low pass filter and the second low pass filter generate split signals that are then provided to level or amplitude detectors that detect an amplitude of the incoming symbols; two low pass filters are then used to set the noise limit for incoming signals; an RX symbol decision module takes the information passed from the two low pass filters and determines whether a symbol corresponds to a high level or a low level; an output of the RX symbol decision module is provided to the RX despreader that correlates the high and low bits of the spread received signal to highs and lows of the processed signal; an output of the RX despreader is provided to an FEC decoder for correlation with the FEC encoder on the transmission side;
an antenna that is included within the packaged integrated circuit, wherein the antenna is manufactured at the time the integrated circuit is manufactured;
a power source that is mounted adjacent to the integrated circuit; and
a integrated circuit package that includes the integrated circuit and the power source.

2. The apparatus of claim 1, wherein the integrated circuit package corresponds to a standard integrated circuit package.

3. The apparatus of claim 1, wherein the power source corresponds to a Microelectromechanical Systems (MEMs) die.

4. The apparatus of claim 1, wherein the power source is mounted on the same chip carrier with the integrated circuit.

5. The apparatus of claim 1, wherein bond wires directly connect the integrated circuit to the power source.

6. The apparatus of claim 1, wherein the power source generates power for the integrated circuit by turning mechanical energy into electrical energy according to the Piezo electric affect.

7. The apparatus of claim 1, wherein the power source corresponds to mounted rare earth magnets and vibrating arms with a metal coil that produce electric power from the electromotive force of the changing magnetic fields enclosed by the moving coil.

8. The apparatus of claim 1, wherein the antenna is manufactured from a top layer of metal associated with the integrated circuit.

9. The apparatus of claim 1, wherein the antenna corresponds to a slotted patch antenna.

10. The apparatus of claim 1, wherein the integrated circuit further comprises an analog compensator, wherein the analog compensator provides analog adjustments to operations of the integrated circuit when the analog adjustments are determined necessary from at least one of operation and wafer tests of the integrated circuit.

11. The apparatus of claim 1, wherein the integrated circuit further comprises a flash memory, wherein the flash memory is arranged to store updates to the integrated circuit.

12. The apparatus of claim 1, wherein the integrated circuit further comprises passive filters that are arranged to determine the logic levels associated with a received signal.

13. The apparatus of claim 1, wherein the integrated circuit further comprises phase locked loop that is arranged to determine the logic levels associated with a received signal.

14. A single integrated circuit package, comprising:
an integrated circuit that includes:
a central processing unit that is arranged to process data that is transmitted and received across a radio frequency network,
a flash memory that is arranged to store the data, wherein the flash memory provides a temporary storage location for data received from a simple node and also provides a data storage location for analog compensation and bits generated from FEC encoding and decoding;
a transmitting side of the integrated circuit that is arranged to process the data for transmission, wherein the transmitting side comprises: a voltage controlled oscillator that changes frequency directly from symbols being transmitted; an FEC encoder arranged to encode bits to be transmitted with Forward Error Correction encoding; a spreader configured to spread the encoded bits by a maximal length pseudo-random code while still providing a narrow bandwidth and after the signal is spread boosting power of a transmission signal using an amplifier;
a receiving side of the integrated circuit that is arranged to process the data when received, wherein the receiving side comprises: an RX amplifier arranged to receive an incoming signal and pass the signal to a mixer which is arranged to mix the signal down to a lower frequency that is then passed to a first low pass filter that removes noise from the signal; from the first low pass filter the signal is then provided through two paths where a high pass filter lets through high level symbols and a second low pass filter lets through low level symbols included in the received signal; wherein the first low pass filter and the second low pass filter generate split signals that are then provided to level or amplitude detectors that detect an amplitude of the incoming symbols; two low pass filters are then used to set the noise limit for incoming signals; an RX symbol decision module takes the information passed from the two low pass filters and determines whether a symbol corresponds to a high level or a low level; an output of the RX symbol decision module is provided to the RX despreader that correlates the high and low bits of the spread received signal to highs and lows of the processed signal; an output of the RX despreader is provided to an FEC decoder for correlation with the FEC encoder on the transmission side;

and
an antenna that is manufactured when the integrated circuit is manufactured; and
a power source that is wire bonded to the integrated circuit and provides power to the integrated circuit.

15. The single integrated circuit package of claim 14, wherein the integrated circuit further comprises a spreading code generator that provides code for spreading a signal to be transmitted and despreading a signal received.

16. The single integrated circuit package of claim 14, wherein the memory of the integrated circuit includes at least one of a flash memory and a random access memory.

17. The single integrated circuit package of claim 14, wherein the receiving side of the integrated circuit is further configured with passive filters to determine logic levels for symbols associated with received data.

18. The single integrated circuit package of claim 14, wherein the receiving side of the integrated circuit is further configured with a phase locked loop to determine logic levels for symbols associated with received data.

19. A system, comprising:
means for determining whether a radio frequency channel is in use;
means for transmitting data across the radio frequency channel; wherein the means for transmitting comprises: a voltage controlled oscillator that changes frequency directly from symbols being transmitted; an FEC encoder arranged to encode bits to be transmitted with Forward Error Correction encoding; a spreader configured to spread the encoded bits by a maximal length pseudo-random code while still providing a narrow bandwidth and after the signal is spread boosting power of a transmission signal using an amplifier;
means for receiving data across the radio frequency channel; wherein the means for receiving comprises: an RX amplifier arranged to receive an incoming signal and pass the signal to a mixer which is arranged to mix the signal down to a lower frequency that is then passed to a first low pass filter that removes noise from the signal; from the first low pass filter the signal is then provided through two paths where a high pass filter lets through high level symbols and a second low pass filter lets through low level symbols included in the received signal; wherein the first low pass filter and the second low pass filter generate split signals that are then provided to level or amplitude detectors that detect an amplitude of the incoming symbols; two low pass filters are then used to set the noise limit for incoming signals; an RX symbol decision module takes the information passed from the two low pass filters and determines whether a symbol corresponds to a high level or a low level; an output of the RX symbol decision module is provided to the RX despreader that correlates the high and low bits of the spread received signal to highs and lows of the processed signal; an output of the RX despreader is provided to an FEC decoder for correlation with the FEC encoder on the transmission side;
means for determining whether the data received corresponds to data from a master node;
means for determining whether the data received corresponds to data from a simple node when the radio frequency channel is shown to be in use; and
means for forwarding the data to another node when the data received is from a simple node.

20. The system of claim 19, further comprising means for updating functions when the data received corresponds to configuration data from a master node.

* * * * *